(12) United States Patent
Savory

(10) Patent No.: US 6,765,723 B1
(45) Date of Patent: Jul. 20, 2004

(54) COMPENSATION OF POLARIZATION-DEPENDENT DISTORTION SUCH AS PMD

(75) Inventor: Seb J Savory, Churchill College (GB)

(73) Assignee: Nortel Networks Limited, St. Laurent (CA)

(*) Notice: Subject to any disclaimer, the term of this patent is extended or adjusted under 35 U.S.C. 154(b) by 53 days.

(21) Appl. No.: 10/106,339

(22) Filed: Mar. 26, 2002

(51) Int. Cl.[7] .......................... G02B 27/28; H04B 10/18
(52) U.S. Cl. ..................... 359/499; 359/494; 359/900; 398/147
(58) Field of Search ................................ 359/498, 499, 359/484, 494, 249, 281, 900, 21; 398/146, 147, 149, 158, 159; 385/11

(56) References Cited

U.S. PATENT DOCUMENTS

| | | | |
|---|---|---|---|
| 6,377,719 B1 * | 4/2002 | Damask ....................... | 385/11 |
| 6,417,948 B1 * | 7/2002 | Chowdhury et al. .......... | 385/11 |
| 6,483,958 B2 * | 11/2002 | Bandemer et al. ............ | 385/11 |
| 6,567,167 B1 * | 5/2003 | Chou et al. .................. | 356/367 |
| 6,661,936 B2 * | 12/2003 | Noe ............................. | 385/11 |
| 2001/0028760 A1 * | 10/2001 | Yaffe ............................ | 385/27 |
| 2002/0018266 A1 * | 2/2002 | Ooi et al. .................... | 359/161 |
| 2002/0075477 A1 * | 6/2002 | Yu et al. ..................... | 356/73.1 |
| 2002/0093643 A1 * | 7/2002 | Moeller ....................... | 356/73.1 |
| 2002/0118455 A1 * | 8/2002 | Damask ....................... | 359/484 |
| 2002/0191285 A1 * | 12/2002 | Damask et al. ............. | 359/484 |
| 2003/0076588 A1 * | 4/2003 | Savory et al. ............... | 359/498 |
| 2003/0108267 A1 * | 6/2003 | Bandemer et al. ............ | 385/11 |
| 2003/0231390 A1 * | 12/2003 | Wein et al. .................. | 359/495 |

FOREIGN PATENT DOCUMENTS

| | | |
|---|---|---|
| WO | WO 00/65401 A1 * | 11/2000 |
| WO | WO 01/67649 A1 * | 9/2001 |

OTHER PUBLICATIONS

M. Shtaif, et al., "A compensator for the effects of high-order polarization mode dispersion in optical fibers", Photonics Technology Lett., IEEE , vol. 12 Issue 4 , pp. 434–436, Apr. 2000 ☐☐.*

P. B. Phua, et al., "Variable second–order PMD module without first–order PMD ", J. Lightwave Technology, vol. 20, Issue: 11, pp. 1951–1956, Nov. 2002 ☐☐.*

O. Leminger, et al., "Statistical Modelling of a Higher–order PMD emulator", 27th European Conf. on Opt. Comm., 2001 ECOC '01, vol. 3, pp. 344–345, Sep. 30–Oct. 4, 2001.*

J. N. Damask, "A Programmable Polarization–Mode Dispersion Emulator for Systematic Testing of 10 Gb/s PMD Compensators", Opt. Fiber Comm. Conf. 2000, vol. 3, 7–10, pp. 28–30, Mar. 2000.*

PTO 03–4712: English–language translation of WO 00/65404 (Siemens A.G.). Ralph McElroy Translation Company, Aug. 2003.*

(List continued on next page.)

*Primary Examiner*—John Juba, Jr.
(74) *Attorney, Agent, or Firm*—Barnes & Thornburg

(57) ABSTRACT

A PMD compensator has three compensation elements in series, each for providing variable differential group delay. Each compensation element provides compensation along a different orthogonal polarization axis. This enables PMD to be cancelled more completely.

14 Claims, 2 Drawing Sheets

OTHER PUBLICATIONS

I. T. Lima, Jr., et al., "Polarization mode dispersion emulator", Optical Fiber Comm. Conf., 2000, vol.: 3, 7–10□□ pp. 31–33, Mar. 2000.*

P. B. Phua, et al., "Deterministic approach to first- and second-order PMD compensation", Photonics Technology Lett., IEEE, vol. 14 Issue: 9, pp. 1270–1272, Sep. 2002.*

Yuan Zheng, et al. "Three-stage polarization mode dispersion compensator capable of compensating second-order polarization mode dispersion", Photonics Technology Lett., IEEE, vol. 14 Issue 10, pp. 1412–1414; Oct. 2002.*

H. Kogelnik, et al, "Emersion and inversion of polarization-mode dispersion", J. Lightwave Technology, vol. 21 Issue 2, pp 482–495, Feb. 2003.*

* cited by examiner

COMPENSATION OF POLARIZATION-DEPENDENT DISTORTION SUCH AS PMD

FIELD OF THE INVENTION

This invention relates to apparatus and methods for providing compensation of polarization-dependent distortion such as Polarization Mode Dispersion (PMD), in high-speed optical transmission networks and systems.

BACKGROUND OF THE INVENTION

Fibre-optic transmission systems are now being developed for tens of gigabits-per-second (Gbit/s) communication channels, whilst large volumes of 10 Gbit/s systems are being fully deployed into existing networks. Various potential limits are approached as the performance of such transmission systems in pushed further. The phenomenon of polarization mode dispersion, PMD, is a problem recently attracting a great deal of attention from the telecommunications industry. PMD is a type of distortion that varies from fibre to fibre and is typically of greater magnitude in older fibres. PMD is also a random phenomenon, varying with both time and optical frequency. Whilst service providers are reluctant to invest in new fibre routes, PMD may restrict the deployment of new systems aver the older fibre routes of their network. In a small number of fibres, PMD will give rise to distortions so large that a 10 Gbit/s optical transmission system cannot be reliably deployed over the route. The impact of PMD scales linearly with system bit-rate, hence PMD will become a greater problem ax the bit-rates of systems are increased. It is for these reasons that PMD solutions have to be found.

PMD in a fundamental characteristic of both optical fibres and optical components. It arises from the consideration that single mode fibre can actually support two weakly guided modes that are orthogonally polarised. In other words, given an ideal fibre, a pulse can be launched into either of these two polarization modes and propagate through the fibre in that polarization mode alone. A fiber exhibits slightly different refractive indices along different axes, a physical characteristic known as birefringence. Birefringence arises from a variety of intrinsic and extrinsic features of the fibre manufacture. These features include geometric stress caused by a noncircular core, and stress birefringence caused by unsymmetrical stress of the core. Other sources of birefringence include external manipulation of the fibre. External forces will include squeezing the fibre, bending the fibre and twisting of the fibre In a birefringent fibre, the propagation speed will vary with the launch polarization state into the polarization nodes of the fibre. Consequently, when proportions of the pulse are launched into both polarization axes they travel at different speeds and hence arrive at different times. The magnitude of the difference in arrival times between the fastest and slowest paths (along the two Principal States of Polarisation-PSPs) through the fibre is known as the differential group delay (DGD).

The receiver of a direct detection optical transmission system does not distinguish between the different polarization modes, but simply detects the combination of the different polarization modes. The difference in arrival times of the pulse through the two polarization modes will degrade the quality of the received data.

In a long length of fibre the birefringence is expected to be weak but vary randomly along its entire length. This leads to random mode coupling along the fibre, a process by which the pulse will continuously couple power between the two polarization modes of the fibre. The phenomenon of PMD relates to the random variation of the DGD of the fibre. The DGD is expected to vary randomly over time due to random variations of the fibre birefringence as a result of environmental effects, such as temperature. A consequence of this random variation means that the instantaneous DGD of a fibre cannot be predicted. Instead the DGD of a fibre must be described statistically. The fibre DGD also varies over frequency/wavelength.

The DGD is the first-order consideration of PMD. It makes the assumption that the PMD characteristics of a fibre are constant over the bandwidth of the transmitted data signal. Higher-orders of PMD are considered when the PMD characteristics can no longer be considered constant over the bandwidth of a signal. Higher-order PMD relates to the variation of the PMD characteristics of a fibre with frequency.

In order to compensate for first order PMD, it has been proposed to use a delay line which provides differential delay for different polarization states, in order to reverse the system fiber DGD. A particular class of fibres, known as high birefringence (Hi-Bi) fibres, has been engineered deliberately to have very high, uniform birefringence for this purpose. The fibres have two clearly definable axes with different refractive indices. The propagation speed of a pulse will differ greatly between each axis.

In all-optical PMD compensation, the restoration of PMD distortion is done optically without any optical-electrical conversion. Normally, all-optical PMD compensators consist of a polarization controller and a fixed birefringent delay element, such as a piece of high birefringence optical fiber. The basic concept is to align the principal states of polarization (PSP) of the fiber with the principal axes of the birefringent delay element to reverse the DGD of the system fiber.

This type of compensator requires tracking of variations in the state of polarization of the incident signal, for example using a polarization tracking system. The need for endless control in polarization tracking devices (whether for use in PMD compensators or in other devices) has been recognised. However, endless control systems are generally complicated and expensive to implement.

SUMMARY OF THE INVENTION

According to a first aspect of the invention, there is provided a PMD compensator comprising first, second and third compensation elements in series, each for providing variable differential group delay, a first polarization converter being provided between the first and second compensation elements and a second polarization converter being provided between the second and third compensation elements, the polarization converters being selected such that each compensation element applies a variable differential group delay to a different orthogonal axis.

This device provides PMD compensation by providing DGD compensation independently along three different orthogonal polarization axes. This enables PMD to be cancelled without the need for an endless polarization controller.

One polarization converter preferably comprises a 45 degree polarization rotator and the other polarization converter comprises a quarter wave plate and a 45 degree polarization converter in cascade. In this way, one converter converts between vertical linear and 45-degree linear polarization and the other converts between linear and circular polarization. This enables three orthogonal axes of the Poincare sphere to be compensated by the three compensation elements.

In one specific example, the first polarization converter comprises a −45 degree polarization rotator and the second polarization converter comprises a quarter wave plate and a +45 degree polarization converter in cascade.

Each compensation element must provide tuneable variable DGD, and various possible designs of compensation element are available.

The control of each compensation element may be in response to a single control parameter, for example the magnitude of the differential group delay at the output of the device. As each compensator is minimising the DGD of one of three orthogonal DGD components present in the input, a single control parameter can be used. However, a dither signal may be applied to the control signal for each compensation element, so that the effect of tuning each compensation element can be detected in the output. Thus, a corresponding spectral component of the differential group delay at the output of the device is used to from the basis of control of each compensation element.

According to a second aspect of the invention, there is provided a method of providing PMD compensation, comprising;

introducing a first differential group delay to minimise a first component of the differential group delay of an input signal;

introducing a second differential group delay to minimise a second component of the differential group delay, orthogonal to the first component, of the input signal; and introducing a third differential group delay to minimise a third component of the differential group delay, orthogonal Lo the first and second components, of the input signal.

This method provides independent minimization of the three orthogonal components of DGD in an input signal, which can enable the DGD to be cancelled more effectively.

In order to enable each compensation stage to operate on a different axis of the DGD, a polarization rotation is preferably performed between the first and second or second and third differential group delay sections, and a linear to circular polarization conversion is performed between the second and third or first and second differential group delay sections.

The levels of the first, second and third differential group delays are preferably selected such as to minimise a control parameter, for example the magnitude of the differential group delay after the introduction of the third differential group delay.

According to a third aspect of the invention, there is provided a device for compensation of polarization-dependent distortion, comprising first, second and third compensation elements in series, each for providing variable polarization-dependent distortion compensation, a first polarization converter being provided between the first and second compensation elements and a second polarization converter being provided between the second and third compensation elements, the polarization converters being selected such that each compensation element applies variable compensation to a different orthogonal axis.

The polarization-dependent distortion may comprise polarization dependent loss, and the compensation elements may then comprise variable polarization dependent loss elements.

BRIEF DESCRIPTION OF THE DRAWINGS

Examples of the present invention will now be described in detail with reference to the accompanying drawings, in which.

DETAILED DESCRIPTION

The invention provides various architectures for providing PMD compensation, essentially by introducing equal and opposite DGD.

Figure 1:
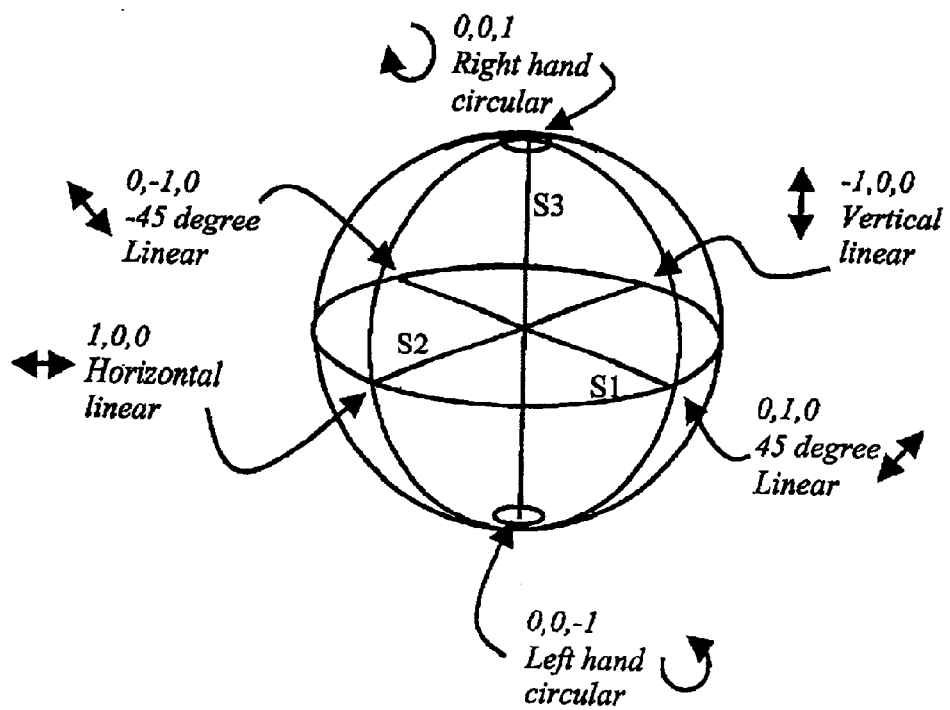
FIG. 1 shows how differential group delay (and polarization) may be represented as a three dimensional vector using the Poincare sphere.

FIG. 1 shows the Poincare sphere, which provides a well known three dimensional vector representation of polarization or DGD. Using this representation, polarization or DGD can be expressed as three Cartesian coordinates, which are the so-called stokes parameters As shown in FIG. 1, one axis (S1) provides the component vertical or horizontal polarization, one axis (S2) provides the component or 45 degree polarization and one axis (S3) provides the component of circular polarization. Any state of polarization can be expressed as a unique combination of these parameters, one the surface of the Poincare sphere. FIG. 1 shows the polarizations represented by opposite extremes of each axis.

The invention is based on the recognition that different orthogonal components (using the Poincare sphere representation) of differential group delay can be compensated independently. Accordingly, reference in the following description and claims to orthogonal polarization components, is intended to refer to different axes of the Poincare sphere. It should be noted, however, that the precise definition of the axis is of course arbitrary, as any three orthogonal axes will enable any point on the surface of the Poincare sphere to be identified uniquely.

Figure 2:
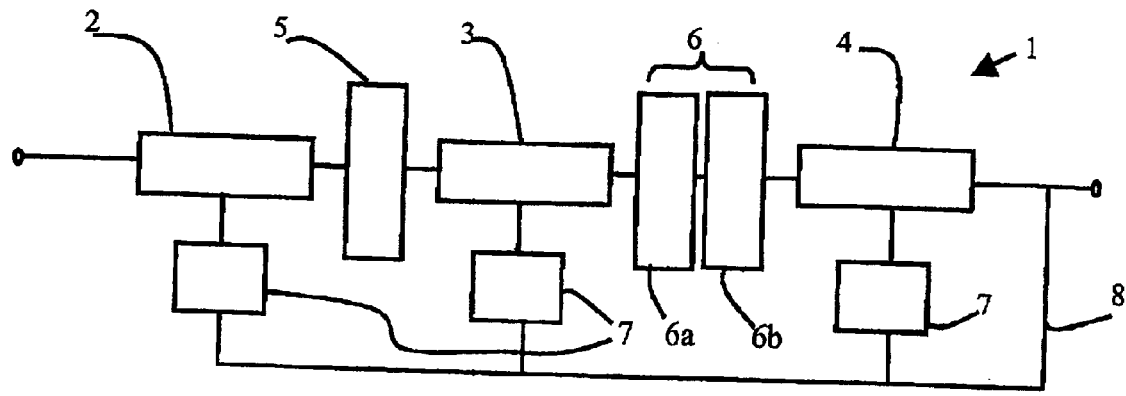
FIG. 2 shows a compensator according to the invention for cancelling DGD in an input signal.

FIG. 2 shows device 1 according to the invention, which comprises first, second and third compensation elements 2,3,4 in series. Each compensation element enables a variable differential group delay to be introduced, and examples of the compensation elements will be given below. A first polarization converter 5 is provided between the first and second compensation elements 2,3 and a second polarization converter 6 is provided between the second and third compensation elements 3,4.

The polarization converters 5,6 are selected such that DGD resulting from three orthogonal polarization components are compensated by the three compensation elements 2,3,4. In this way, DGD compensation is provided independently along three orthogonal axes, which enables endless PMD compensation.

The device of the invention can compensate a signal with any polarization, so that no polarization alignment is required at the input to the device. Instead, the first compensation element 2 defines the reference frame for the device. The DGD compensation provided by the first compensator 2 is essentially compensation along an arbitrary axis within the Poincare sphere.

In one specific example, the first polarization converter 5 comprises a 45 degree polarization rotator, for example a −45 degree rotator. In this way, an orthogonal axis is compensated by the second compensator 3. For example, if the first compensator 2 operates on a +45 degree linear polarization component (S1 in FIG. 1), then the second compensator 3 will operate on a horizontal linear polarization Component (S2 in FIG. 1).

The second polarization converter 6 comprises a quarter wave plate 6a and a 45 degree polarization converter 6b in cascade. The quarter wave plate coverts between linearly and circularly polarized light, and the result is that a the third compensator 4 operates on a third orthogonal axis.

In this way, three orthogonal axes of the Poincare sphere are compensated independently by the three compensation elements.

The device can provide endless tracking, in that control of the three compensators within suitable limits enables any point on the Poincare sphere to be tracked without the compensators exceeding their compensation ranges.

Each compensating element is controlled by a controller 7 which processes a feedback signal 8 to provide suitable control signals for the compensating element. The control of each compensating element can be to minimise the magnitude of the DGD in the output signal. Each element can be controlled independently to minimise the A dither signal may be applied by the controller to the control signal for each compensating element, so that the effect of tuning each compensation element can be detected in the output. Thus, a corresponding spectral component of the differential group delay at the output of the device is used to from the basis of control of each compensation element.

The compensating elements used in each of the three sections can take various forms, and one preferred possibility will now be discussed.

Figure 3:
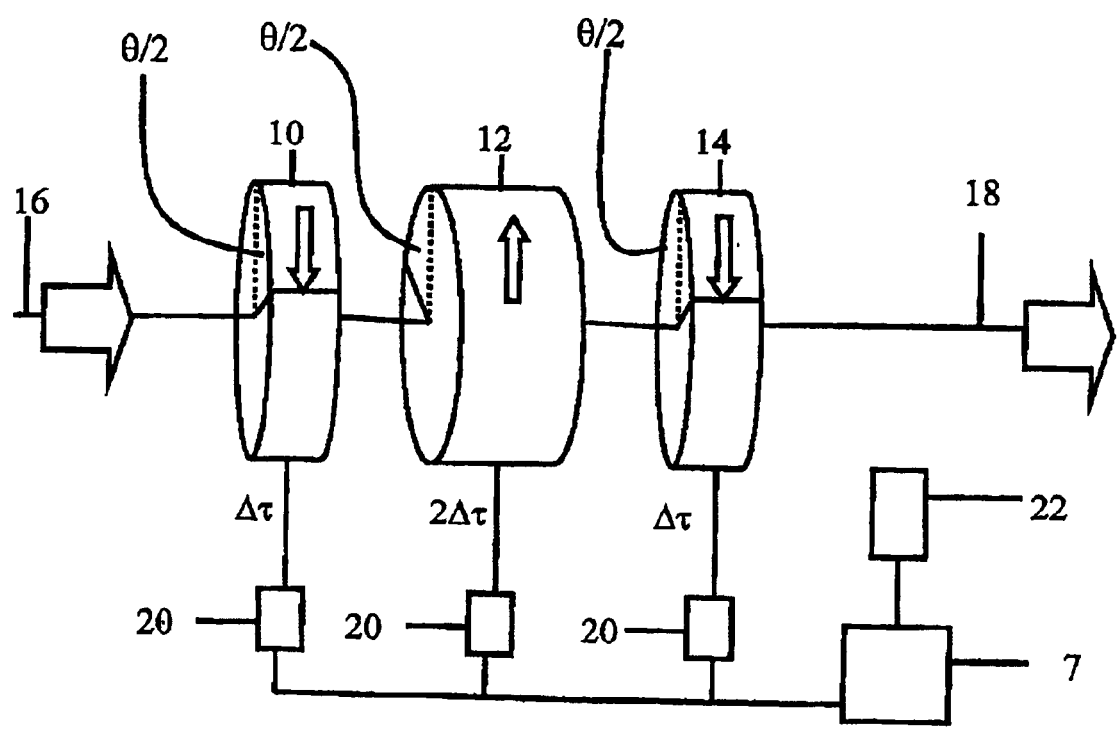
FIG. 3 shows one possible first order PMD compensation arrangement suitable for use in the compensator of FIG. 2.

The example of compensating element shown in FIG. 3 provides first order PMD compensation with no second order PMD penalty.

The compensating element of FIG. 3 comprises first, second and third birefringent elements 10, 12, 14 arranged in order between the input 16 and output 18 of the compensator. The elements have first, second and third DGDs, respectively, in the ratio 1:2:1, as shown in FIG. 3. For example, the elements may have the same birefringence, but have lengths in the ratio 1:2:1. Each birefringent element has two orthogonal principal axes, which are the axes of maximum and minimum refractive index.

Each birefringent element is rotatable about an axis corresponding to the direction of propagation of the input signal. A rotation controller 20 is provided for each element to enable control of the angle of rotation of each element 10, 12, 14. This enables the orientation of the PSPs of the signal in the element to be rotated relatively to the principal axes of the element. In particular, the orientation of the principal axes of the second birefringent element relative to the first birefringent element can be varied and the orientation of the principal axes of the third birefringent element can be varied relative to the second birefringent element.

The change in this orientation between the first and second elements is equal and opposite to the change in orientation between the second and third elements. In the example shown in FIG. 3, the three birefringent elements are arranged to have a default position (the dotted vertical line). When all three birefringent elements are in the default position, the compensator provides its maximum level of PMD compensation, which is the sum of the DGD of the three elements 10, 12, 14.

To provide a different level of PMD compensation, the three elements are rotated. In particular, the first birefringent element is rotated by a selected angle $\theta/2$ in a first sense, the second birefringent element is rotated by the selected angle $\theta/2$ in a second, opposite sense, and the third birefringent element is rotated by the selected angle $\theta/2$ in the first sense. The orientation of the principal axes of the second birefringent element relative to the first birefringent element is thus varied by an angle e in one sense and the orientation of the principal axes of the third birefringent element is thus varied relative to the second birefringent element by an angle $\theta$ in the opposite sense.

This arrangement provides a variable first order PMD compensator with no second order PMD penalty. This can best be demonstrated mathematically.

A birefringence element with differential group delay $\Delta\tau$ may be represented as a Jones matrix M, given by, $$M(\Delta\tau) = \begin{pmatrix} \exp(j\omega\Delta\tau/2) & 0 \\ 0 & \exp(-j\omega\Delta\tau/2) \end{pmatrix}$$

and a polarization rotation of angle $\theta$ may be represented as:

$$R(\theta) = \begin{pmatrix} \cos(\theta) & \sin(\theta) \\ -\sin(\theta) & \cos(\theta) \end{pmatrix}$$

The first birefringent element in FIG. 3 may be represented by a rotation of $\theta/2$, followed by a delay of $\Delta\tau$ followed by a rotation of $-\theta/2$. Thus, the effect of the physical rotation of the element is to rotate the PSPs of the input signal, to pass the rotated signal through the birefringent element, and to rotate the PSP back to the original orientation. (since the orientation of the PSPs is not changed by the birefringent element which is a polarization maintaining high birefringence fiber), Thus for the first element 10, the transformation on the input signal can be represented as:

$$T_{10} = R(-\theta/2)M(\Delta\tau)R(\theta/2)$$

The complete transfer function of the arrangement of FIG. 3 is:

$$T = R(-\theta/2)M(\Delta\tau)R(\theta/2).R(\theta/2)M(2\Delta\tau)R(-\theta/2).R(-\theta/2)M(\Delta\tau)R(\theta/2)$$

This simplifies to:

$$T = R(-\theta/2)M(\Delta\tau)R(\theta)M(2\Delta\tau)R(-\theta)M(\Delta\tau)R(\theta/2)$$

By evaluating these matrix products, it can be shown that:

$$T = \exp\left\{\omega\begin{pmatrix} 2j\cos(\theta)\Delta\tau & 0 \\ 0 & -2j\cos(\theta)\Delta\tau \end{pmatrix} + O(\omega^3)\right\}$$

Provided that the frequency range of interest is small enough, the $O(\omega^3)$ term may be neglected, and the differential group delay is a first order term of $4\cos(\theta)\Delta\tau$, By varying the rotation angle $\theta$ between $\pi/2$ and 0 radians (i.e. varying the rotation angle $\theta/2$ between $\pi/4$ and 0 radians) the DGD may be varied from 0 to $4\Delta\tau$. This arrangement provides first order PMD compensation with no second order penalty, as there are no terms in $\omega^2$.

As shown in FIG. 3, a feedback loop is implemented, with unit 22 providing a measure of the DGD in the system (this unit 22 may be shared for all compensators as explained above). For a 10 Gbps system, this could be a 5 GHz RF spectral component or a Stokes analyser from which the degree of polarization is calculated. In both cases, maximising the control signal corresponds to minimising the residual PMD. Other techniques for providing feedback control based on the DGD at the output will be known to those skilled in the art, including Q factor analysis. A processor 7 at the output of the compensator provides the required control of the rotation controllers 20.

This compensating element design is only one example of a possible implementation, and many other systems for introducing variable DGD will be known to those skilled in the art. Programmable differential group delay line devices are readily available, for example from the company General Photonics Corporation.

The compensating element described above provides first order compensation with no second order penalty. It is possible to combine a second order compensator with the first order compensator to provide first and second order compensation, if desired. Various compensating element designs are described in the assignee's co-pending U.S. patent application Ser. No. 09/975,830 entitled "Generation of variable differential group delay", and which is incorporated herein by way of reference material.

The invention has been described above implemented as a PMD compensator. However, the principles underlying the invention may equally be applied to the compensation of other polarization-dependent distortion, in order to provide independent compensation for three orthogonal polarization axes. For example, the architecture described above may be applied to a polarization-dependent loss compensator, by replacing the variable DGD elements (2, 3 and 4 in FIG. 2) by variable polarization dependent loss elements.

Various modifications to the examples described above will be apparent to those skilled in the art.

We claim:

1. A PMD compensator comprising first, second and third compensation elements in series, each for providing independently controllable variable differential group delay, a first polarization converter being provided between the first and second compensation elements and a second polarization converter being provided between the second and third compensation elements, the polarization converters being selected such that each compensation element applies a variable differential group delay to a different orthogonal axis.

2. A compensator as claimed in claim 1, wherein one polarization converter comprises a 45 degree polarization rotator and the other polarization converter comprises a quarter wave plate and a 45 degree polarization converter in cascade.

3. A compensator as claimed in claim 2, wherein the first polarization converter comprises a −45 degree polarization rotator and the second polarization converter comprises a quarter wave plate and a +45 degree polarization converter in cascade.

4. A compensator as claimed in claim 1, wherein each compensation element comprises:

first, second and third birefringent elements arranged in order between the input and output of the element and having first, second and third differential group delays (DGDs) in the ratio 1:2:1, and having principal axes, wherein the first, second and third birefringent elements are rotatable.

5. A compensator as claimed in claim 4, wherein the rotating means is adapted to rotate the first birefringent element by a selected angle in a first sense, to rotate the second birefringent element by the selected angle in a second, opposite sense, and to rotate the third birefringent element by the selected angle in the first sense.

6. A compensator as claimed in claim 1, wherein the compensation elements are each controlled to minimise a single parameter.

7. A compensator as claimed in claim 6, wherein the single parameter comprises the magnitude of the differential group delay at the output of the compensator.

8. A compensator as claimed in claim 1, wherein the compensation elements are each controlled to minimise a respective parameter.

9. A compensator as claimed in claim 8, wherein a control signal is applied to each compensation element, a dither signal is applied to the control signal for each compensation element, and the respective parameter comprises a corresponding spectral component of the differential group delay at the output of the compensator.

10. A method of providing PMD compensation, comprising:

introducing a first differential group delay to minimise a first component of the differential group delay of an input signal;

introducing a second differential group delay to minimise a second component of the differential group delay, orthogonal to the first component, of the input signal, the second differential group delay being selected independently of the first differential group delay; and introducing a third differential group delay to minimise a third component of the differential group delay, orthogonal to the first and second components, of the input signal, the third differential group delay being selected independently of the first and second differential group delays.

11. A method as claimed in claim 10, further comprising performing a polarization rotation between the introduction of the first and second or second and third differential group delays, and performing a linear to circular polarization conversion between the introduction of the second and third or first and second differential group delays.

12. A method as claimed in claim 10, wherein the levels of the first, second and third differential group delays are selected such as to minimise a control parameter.

13. A method as claimed in claim 12, wherein the control parameter comprises the magnitude of the differential group delay after the introduction of the third differential group delay.

14. A device for compensation of polarization-dependent distortion, comprising first, second and third compensation elements in series, each for providing independently controllable variable polarization-dependent distortion compensation, a first polarization converter being provided between the first and second compensation elements and a second polarization converter being provided between the second and third compensation elements, the polarization converters being selected such that each compensation element applies variable compensation to a different orthogonal axis.

* * * * *